United States Patent [19]

Stolzenberg et al.

[11] Patent Number: 4,552,575

[45] Date of Patent: Nov. 12, 1985

[54] METHOD FOR THE MASS SEPARATION OF A LIQUID MIXTURE THROUGH FRACTIONAL CRYSTALLIZATION

[75] Inventors: Konrad Stolzenberg, Waltrop; Karl H. Koch; Rolf Marrett, both of Castrop-Rauxel, all of Fed. Rep. of Germany

[73] Assignee: Ruetgerswerke Aktiengesellschaft, Frankfurt, Fed. Rep. of Germany

[21] Appl. No.: 460,429

[22] Filed: Jan. 24, 1983

[30] Foreign Application Priority Data

Feb. 4, 1982 [DE] Fed. Rep. of Germany ....... 3203818

[51] Int. Cl.$^4$ .............................................. B01D 9/02
[52] U.S. Cl. .................................... 62/544; 585/812; 585/815; 260/707
[58] Field of Search ........................... 23/300; 62/544; 260/707, DIG. 35; 585/812, 815

[56] References Cited

U.S. PATENT DOCUMENTS

| | | | |
|---|---|---|---|
| 2,816,821 | 12/1957 | Weedman et al. | 62/544 |
| 3,272,875 | 9/1966 | Gordon et al. | 260/646 |
| 4,291,550 | 9/1981 | Engdahl et al. | 62/544 |

FOREIGN PATENT DOCUMENTS

| | | |
|---|---|---|
| 1769123 | 2/1976 | Fed. Rep. of Germany . |
| 2606364 | 7/1981 | Fed. Rep. of Germany . |
| 1589317 | 4/1970 | France ....................... 23/300 |
| 589997 | 1/1978 | U.S.S.R. ..................... 23/300 |

OTHER PUBLICATIONS

Perry et al., Chemical Engineer's Handbook, 5th Ed., McGraw-Hill, 19-26, 33.

*Primary Examiner*—Hiram H. Bernstein
*Attorney, Agent, or Firm*—Beveridge, DeGrandi & Weilacher

[57] ABSTRACT

The invention relates to a method and an apparatus for the mass separation of a liquid mixture through fractional crystallization, wherein the crystal layer is crystallized on the indirectly cooled wall of the crystallization zone. The mass transfer occurs in thin boundary layers which are produced by rising gas bubbles which glide as closely as possible along the heat-dissipating surfaces. The method is well suited for products which form only a soft crystal layer with a rough surface. It is carried out in a vertical pipe heat exchanger into the pipes of which (6) there extend into the lower part thereof gas-inlet pipes (7) which are mounted in the middle and are secured with centering pins (8). The maximum inside diameter of the pipes is dependent upon the optimum thickness of the crystal layer and of the concentration of the crystallizable component in the feedstock.

5 Claims, 2 Drawing Figures

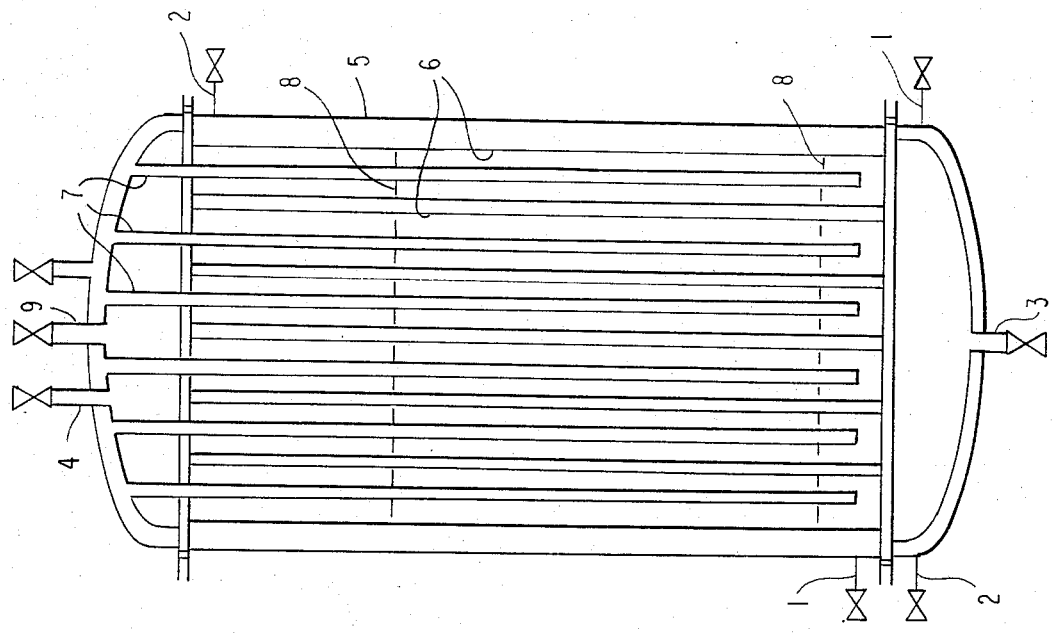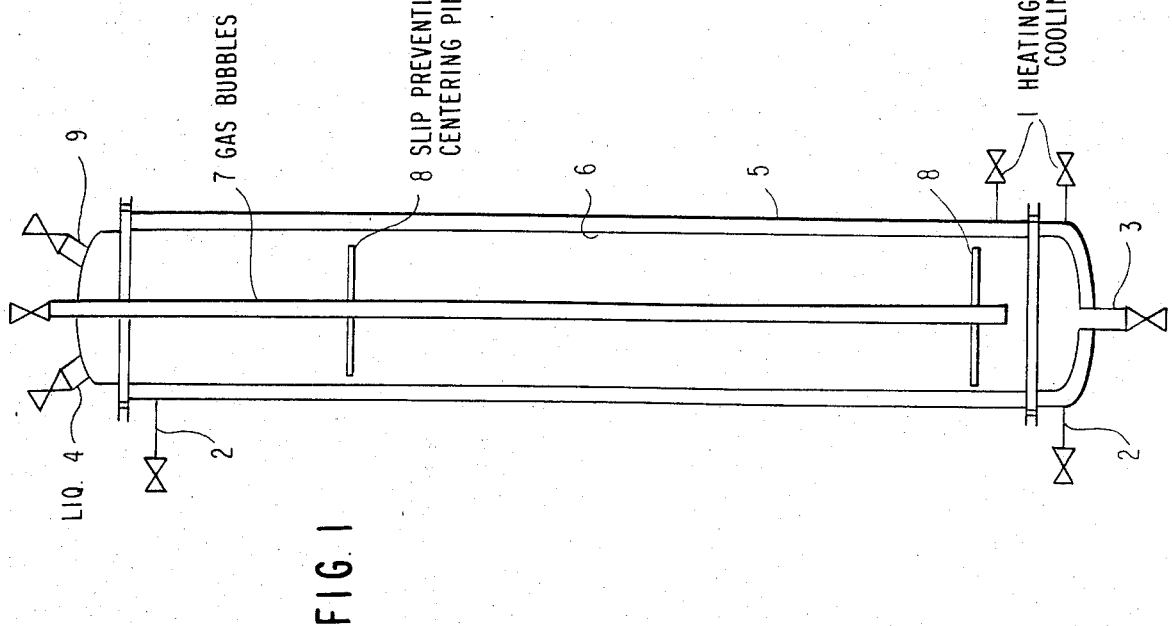

METHOD FOR THE MASS SEPARATION OF A LIQUID MIXTURE THROUGH FRACTIONAL CRYSTALLIZATION

The present invention relates to a method and an apparatus for the mass separation of a liquid mixture through fractional crystallization by precipitating a crystal layer on the wall of a filled crystallization zone, wherein the liquid phase is cooled indirectly and the mass transfer takes place from thin boundary layers. Removal of the residual liquid and melting down of the crystal layer occurs in one or more steps.

Due to ever-increasing energy costs, crystallization methods for mass separation are rapidly growing in favor compared to the prevailing rectification methods.

Numerous crystallization methods are known which, though not universally applicable, can successfully be applied to certain separation problems. Processes are known in which the crystallization takes place from a solvent, and others in which it occurs from a melt.

These methods can be divided into two groups: In the first group, a crystal suspension is produced which must be separated by mechancial means through filtration, separation, and the like into crystal stock and mother liquor. A large amount of apparatus is required of these methods so that they usually are not economically feasible.

In the second group, a continuous crystal layer is produced, which simplifies the separation into crystal stock and mother liquor. Two procedures are realized here: crystallization from a standing phase and crystallization from thin boundary layers of a moving liquid phase.

The first group of methods has the drawback that the separation effect of the single crystallization step through an occluded mother liquor and dendritic crystal growth due to subcooling is often insignificant and, thus, comparatively many crystallization steps must be made one after another. This makes an economical operation difficult.

In the second group of methods, as exemplified by German DE-AS No. 2,606,364, a thin boundary layer is produced through a turbulent flux, from which the crystal layer is produced on the wall of the crystallization zone. The separation effect of a single step is considerably better.

The disadvantage of these methods is that the crystal layer, especially the crystals that are just growing on the surface, is subjected to considerable fluid-dynamic forces by the turbulent flow. Therefore, these methods are not suited for crystals which only adhere to the solid surface through small bonding forces or which have a tendency toward nucleation. Moreover, these methods are not suited for the crystallization of materials which tend to crystallize in needle-like structures, since the needles break off from the crystal surface because of the great fluid-dynamic forces, and lead to the formation of suspensions.

Another method is known and described in German DE-AS No. 1,769,123 in which the fluid mixture is conducted over the cooling surfaces as a falling film. It is well suited for purifying products which form a firm crystal layer with a smooth surface, but not for products which form a soft crystal layer with a rough surface.

A further drawback of these known methods is that in order to avoid unwanted crust formations, an accessory heater must be provided for the deflector and carrier pipes, as well as the conveyor units, wherein the temperature of the liquid phase attains values above the metastable range of crystallization. This supplied heat must also be removed from the liquid phase over the cooling surfaces of the crystallizer. This leads to uneconomical extensions of the process.

In addition, the introduction of the heated liquid phase results in crystal layers with an uneven thickness in the inlet area of the crystallizer (funnel-shaped crystal layers). This leads to a deterioration of the space-time yield. Occasionally, this causes the crystallization equipment to clog up.

According to theoretical and experimental investigations, the effective separation efficiency during crystallization is primarily determined by the crystallization rate and by the diffusion ratios in the stationary or laminarflowing boundary layer at the interface. To reduce the thickness of the boundary surface, conveyor units are usually installed to supplement the natural convection with a forced convection, with the result that the crystallization rate is fitted to the separation task at hand.

Therefore, in order to avoid the shortcomings of the known crystallization methods, the need arose for the development of a method and an apparatus with which even substances that produce soft crystal layers with rough surfaces can be crystallized from a solution or a melt from thin boundary layers on cooled surfaces with a good separation effect.

This problem was solved by the invention using a method which is characterized in that the thin boundary layers are produced without recycling the liquid phase by means of gas bubbles introduced at the bottom of the crystallization container. During their ascent through the liquid phase, these bubbles brush as closely as possible along the heat-dissipating surface.

The method according to the invention utilizes the fact that in a two-phase flow which is forced through solid surfaces, a thin liquid film develops between the wall surface and the boundary layer between the gaseous and the liquid phase. The gaseous phase and the liquid film flow in opposite directions and, as a result of the non-stationary starting currents, very thin boundary layers are formed for the thermal and material transport and the turbulences in the return-flow area behind the bubbles contribute to an adequate transverse mixing of the liquid phase and, thereby, to equalization of concentration differences. In the apparatus utilized in this invention, the liquid in the system is stationary, nevertheless there is a relative movement of the liquid due to the movement of the gas bubbles. Theoretically with cylindrical bubbles, the liquid film between the wall surface and the bubble can be a monomolecular layer.

According to a very advantageous mode of carrying out the method of this invention, the crystallization is carried out with vertically installed pipes which are cooled from the outside, with the gas being introduced at the bottom end into the pipe which is filled with a melt or a solution. With this embodiment, it is possible to cause the entire liquid to flow downward between gas bubbles and crystal layer over the thin liquid film for every ascending gas bubble. The kind of gas flow can be set through the gas flow rate as a function of the pipe diameter. Thus, the amount of fluid-dynamic stresses is matched to the type of material to be crystallized. The gas flow rate is set in such manner that at the start of crystallization, a stream of spherical gas bubbles are produced which have a smaller diameter than that of the pipe. The gas bubbles are enlarged by coalescence during the ascent of the bubbles, resulting in the formation of umbrella- or cylindrically-shaped bubbles. With increasing reduction of the free cross section as a result of the growing crystal layer, the gas portion flowing through the residual melt increases, and this leads to a continuous improvement in the conveyance of heat and material. In this way, the increase in the resistance to heat conduction is counteracted by the growing crystal layer. In the case of very fragile crystals, the amount of gas can also be reduced with progressive crystallization.

In mixtures of materials which crystallize into very fragile structures, it is advantageous to introduce from the start smaller quantities of gas through suitable nozzles so that small spherical bubbles develop which rise as a swarm of bubbles without coalescence. In this way, the breaking off of crystal pieces from the growing crystal layer is avoided very effectively. The type of bubble flow and, thereby, the ascent rate of the gas bubbles are influenced by the following factors: bubble diameter, pipe diameter, as well as concentration, viscosity, and surface tension of the mixture of materials to be crystallized. The appropriate bubble flow for a certain mixture of materials can be determined, for example, in a glass apparatus through laboratory experiments, in which the coalescence behavior of the bubbles and the amount of fluiddynamic stress on the crystal layer can be observed in accordance with the type of bubble and the speed of the gas in an empty pipe. The hold-up of the gas phase, empirically, is between 1 and 20 volume percent.

According to the method of the invention, the fractional crystallization is carried out according to known methods such that, after precipitation of the crystals on the wall of the crystallization zone, the residual fluid is drained. In principle, recovery rates of up to 100% are possible. Preferably, they are between 50 and 95%, and the crystal layer is then melted by increasing the temperature to the point where the melt can be removed in individual fractions. The crystals are formed out of the molten mass by indirect cooling. Therefore, the temperature of the tube during the crystallization phase is below the melting point of the crystals.

The present invention is illustrated in the drawings wherein:

FIG. 1 is a cross-sectional view of a crystallization apparatus with a single tube; and FIG. 2 is a cross-sectional view of a multiple tube bubble heat-exchanger used in the preferred aspect of the invention.

The adhesion between the heat-exchanging surface and the crystal layer is considerably reduced as a result of the heat input which, in conventional methods, can cause the entire crystal material to slide off or crystal clods to be wedged such as, for example, in the case of the falling-film crystallizer described in German DE-OS No. 1,769,123. Such sliding off is prevented by the centering pin 8 located in the middle of each of the crystallization pipes 6 of the gas inlet pipe 7 installed in accordance with the invention, because during the melting-down the crystal layer hangs on to the gas inlet pipe 7 which is relatively the coldest spot (from a cross-sectional point of view). Thus, the crystallized nucleus in the crystallization pipe 6 is prevented from sliding off.

The fractionation is carried out in stages, with each cycle consisting of several stages. The residual melt and the individual fractions of the melted-down crystal with relatively low purity are fed to the feedstock for the stage of the subsequent cycle which corresponds to the prevailing concentration. The residual crystals also serve as feedstock for the subsequent stages of the same cycle. The melt (heated, if necessary) of the same average concentrate from the previous cycle can be used in order to melt down the residual crystals.

The allocation of the material streams in each stage, as well as the necessary number of stages, is determined by the required yield and the desired purity of the crystals from the last stage.

The multistage fractional crystallization can be carried out successively in one and the same apparatus, with the residual melts or solutions and the individual fractions of the melted-down crystals from the single stage being stored in appropriate vessels. However, this process can also be carried out in a number of serially connected crystallization apparatuses.

In separating out a substance by crystallization from a liquid melt phase, one obtains more crystals as the temperature is lowered. However, impurities in the crystals will increase until the freezing temperature of the lowest melting point is reached at which point a complete admixture of all ingredients is obtained. In order, therefore, to obtain crystals of high purity, the fractional crystallization is carried out by successive steps wherein temperature differences between the liquid phase and the cooling surface are kept to a minimum. Then in successive steps, the liquid phase is cooled to incrementally lower temperatures.

The gas which is introduced in order to produce the liquid film in the crystallizing apparatus can, if necessary after cooling, be circulated so as to separate out condensation products, especially in cases where the gas is loaded with environmental pollutants. If crystallization takes place from a volatile solvent, the residual crystal, at least from the last stage, is dried in a vacuum before melting-down.

The method of the invention is distinguished from known comparable crystallization methods by a number of advantages:

The crystallizing liquid mixture is not circulated during the crystallization process and, therefore, need not be heated.

Through the rising bubbles, the growth of a uniformly thick crystal layer is achieved throughout the apparatus, since the transfer of heat and of material is favorably influenced by violent turbulences and thin boundary-surface thicknesses.

It should be noted that turbulence at the wall surface where the crystals are forming is undesirable, while turbulence out in the liquid phase is not undesirable. This is a further advantage of the present invention in being able to achieve these conditons.

The quasi-standing liquid phase, which is only moved by the rising gas bubbles, exhibits no concentration differences either in the axial or in the radial direction. This does not exist in all known methods in which the fluid to be crystallized is recycled. Therefore, any desired scale-up in the axial direction is possible without reducing the effectiveness of the method.

The magnitude of the fluid-dynamic stress on the crystal layer can easily be fitted to the type of crystal.

It is also possible to crystallize materials which have only a limited adhesion to a cooled wall, since the necessary adhesion and the fluid-dynamic stress can be appropriately matched to decrease the buoyancy.

The crystal layers are prevented from falling off during the melt-down.

The method can be used for a large number of materials. Examples that can be mentioned, without limitations are:

Aromatic hydrocarbons such as napthalene, 1- and 2-methyl-naphthalene, acenaphthene, fluorene, phenanthrene, anthracene, fluoranthene and pyrene; phenols such as p-cresol, 2,6- and 3,5-dimethylphenol, cumylphenol and 0,0-diphenol; heterocyclic nitrogen compounds such as indole and carbazole; heterocyclic oxygen compounds such as diphenylneoxide; chlorinated hydrocarbons such as dichlorobenzene, as well as paraffines above $C_{17}$.

The following examples are intended to illustrate the method further, without limiting it thereto.

EXAMPLE 1

A double-walled tube is used as a crystallization tube provided with an inlet and an outlet for the liquid phase and intake and discharge ports for the temperature medium. A thin gas inlet tube is located in the middle of the crystallization with an external diameter of 6 mm. The crystallization tube is connected to a cooling and a heating unit which are controlled via control circuits. Tube diameter, inside: 8.5 cm.
Crystal layer thickness: 1.5 cm.

A 58% acenaphthene fraction is used as feedstock. The crystallization is carried out in four steps with a gas flow rate of 30 1/hr of nitrogen. The gas-bubble diameter becomes larger due to coalescence. The acenaphthene concentration of the crystals from the fourth step is 98.6% with a yield of 76.25% by weight.

By using a stripping step to increase the yield (i.e., the addition of the starting material takes place in the second step), the pure crystal is recovered from the fifth step. The residue from step 1, which is flushed out of the system, contains only 14.0 weight percent acenaphthene, whereas the pure crystal from the fifth step contains 98.6 weight percent. As a result, the yield of the process is 87.2% referred to the acenaphthene contents of the feedstock.

EXAMPLE 2

The fractional crystallization of a 94% acenaphthene fraction is carried out in an apparatus constructed like a tube-bundle heat exchanger, with the parallel-oriented, vertically installed crystallization tubes having the same geometrical dimensions as the single tube in Example 1.

For comparison, the one-step fractional crystallization is carried out with and without introduction of nitrogen gas bubbles. With the same temperature control, same type of fractionation, and with a crystal recovery rate of 95% for the single-step fractional crystallization, the following results are obtained:

| Nitrogen flow per tube | Time required for crystallization | Concentration of the pure crystals |
|---|---|---|
| 0 1/h | 110 min | 98.2% |
| 30 1/h | 65 min | 98.8% |

EXAMPLE 3

The crystallization of a 40% pyrene fraction is carried out in a tube-bundle heat exchanger. The crystallization tubes have a diameter of 9.1 cm, the crystal layer has a maximum thickness of 8 mm. Solvent naphtha is used as the crystallization solvent. The mixture ratio is 80 parts pyrene fraction to 20 parts solvent naphtha. The solvent naphtha used has a boiling point of 160° C.

The construction of the crystallization apparatus corresponds to the set-up illustrated in FIG. 2.

The liquid solution is filled into the crystallization apparatus and cooled down to the point where the temperature of the solvent in the middle of each crystallization tube reaches 27° C. The temperature in the cooling circuit should not be lowered below 21° C. During the cooling-down period, nitrogen is introduced to the lower portion of the crystallization apparatus through gas-inlet tubes and bubbles through the solution. The gas flow rate in the single tube is 80 1/hr at the beginning and is reduced to 10 1/hr at the end of the crystallization. Then, the still liquid solvent, which is loaded with contaminants, is drained by means of the valve located on the bottom of the apparatus. Through cautious heating and simultaneous reduction of the pressure to 500 mbar, the residual contaminants and the solvent are removed from the crystal layer. Above a temperature of 145° C., the pressure in the crystallization apparatus is again elevated to normal pressure. The liquid which may have collected on the bottom of the crystallizer is drained. With further temperature increase pyrene is obtained with a purity of at least 90° C.

EXAMPLE 4

50% anthracene is crystallized in an apparatus which is constructed like a tube-bundle heat exchanger (FIG. 2). The anthracene fraction is mixed with acetophenone as solvent. Mixing ratio: 2 parts of solvent to 1 part of anthracene 11.5 cm, the crystal layer is 5 mm maximum.

The gas-outlet line is connected to a vacuum pump with a cold trap connected therebetween. The arrangement of the gasinlet tubes and of the cooling and heating circuits corresponds to the construction described in Examples 1 and 2. The liquid solution is filled into the crystallization apparatus and cooled down to the point where the temperature in the middle of each crystallization tube is 27° C. At the same time, the temperature in the cooling circuit should not be lowered below 21° C. During the cooling-down period, nitrogen is introduced into the lower part of the crystallization apparatus gas-inlet tubes and bubbles through the solution. The gas flow rate in each tube is reduced from 100 1/hr to 10 1/hr at the end of the crystallization. The solvent, loaded with contaminants, is then drained by means of the valve located on the bottom. By means of the heating circuit, the temperature of the crystal layer located on the wall is raised, at the same time the pressure in the crystallization apparatus is set at 500 mbar through the gas-outlet line. Above a temperature of 211° C., the pressure is again raised to normal pressure. The liquid which has collected on the bottom of the apparatus is drained.

The anthracene, which melts when the temperature is increased further, has a purity of at least 95% and is free of solvents.

The apparatus to carry out the method is represented in its simplest form in FIG. 1 and consists of a vertically mounted crystallization tube 6 with a jacketed tube 5 which is fitted with connections 1 and 2 for the inlet and outlet of the heating medium. At the bottom end of the crystallization tube there is provided a connection 3 for the inflow and discharge of the liquid phase. Inflow takes place through the connection 4 located at the top of the crystallization tube 6. In the middle of the crystallization tube there extends into its lower portion from above a gas inlet pipe 7 which is centered by means of pins 8. A single pin or plurality of pins 8 may be employed for purposes of the invention. With more pins, the cost of the apparatus may increase. The location of the pin is not narrowly critical but the centering effect obtained through use of the pins is better when there is a substantial distance between the pins; for example, one set of pins located near the lower end of the tube and another set about half way along the length of the tube as nearer to the upper end as illustrated in FIG. 1. The introduced gas escapes through the gas-outlet tube 9 at the top of the crystallization tube 6. It can also be passed to a condenser and/or scrubber in the circuit. If necessary, the circulation line can also be fitted with a vacuum hook-up.

In a preferred embodiment, a vertically mounted tubebundle heat exchanger is used, as illustrated in FIG. 2. The tubes 6 serve as crystallization tubes and are surrounded by a jacketed tube 5. The gas is introduced through gas-inlet tubes 7 which are positioned in the middle of the single crystallization tubes 6 by means of centering pins 8 and escapes through the gas-outlet tube 9 at the top of the heat exchanger. Gas outlet tube 9 can also be connected to a vacuum line (not shown) for removing the gas. The liquid phase is pumped in at the top or bottom of the heat exchanger through connections 4 or 3 in the crystallization tube 6 and can be drained again through connection 3.

No problems arise with the arrangement of the gasinlet tubes 7, since this arrangement is self-regulating: The crystallization preferably takes place in the tubes where the flow is very strong. However, this leads to premature clogging of the gas-outlet opening, with the result that the gas flow in the tubes which have not been as heavily clogged through crystallization is increased, thereby accelerating the crystallization rate.

The optimal inside diameter of the crystallization tubes depends on the concentration of the material in the liquid phase to be crystallized. It should be dimensioned such that an optimum is attained between the quantity of the crystallized material and the average crystallization rate. If an externally cooled crystallization tube is utilized, the maximum tube diameter is obtained in accordance with the following equation:

$$d = 2s \frac{1 + \sqrt{1 - C_{cryst}}}{C_{cryst}}$$

wherein:
d = inside diameter of tube
s = thickness of the crystal layer $C_{cryst}$ = proportion of the component to be crystallized in the starting material.

The thickness of the crystal layer is usually determined by economic factors such as energy cost, time-space yield, etc. To obtain the optimum crystal layer thickness, the average heat transition coefficient is determined in a laboratory test in accordance with the thickness of the crystal layer. The layer thickness at different freeze-out, or crystal yield, rates is either calculated from the material balance or is measured directly. From the logarithmic average temperature differences during crystallization the heat exchanger surface of the crystallization apparatus, as well as the average heat flow, can be calculated in accordance with the known equations of the heat transfer of the heat transition coefficient K.

For economic reasons, an average heat transition coefficient should not drop below 25 W/m²K. This value is usually obtained for crystal layer thicknesses less than 20 mm.

It will be seen that cooling of the liquid phase is not done directly as by mixing with another cooler phase; e.g. the gas, but instead is accomplished by contacting a wall or surface that is cooled with another medium. This is what is meant by indirect cooling in this case.

In another form of construction for suitable crystallization apparatuses, plate-like heat exchangers can be used in which the gas bubbles from the gas-outlet tubes can be passed from the bottom to the top between two neighboring heatexchanger plates. The plates can be mounted vertically as well as obliquely to the vertical axis. In cross section, the apparatus utilizing the plate-like heat exchangers would appear the same as the configuration shown in FIGS. 1 and 2 for the reason that in longitudinal cross section, there is no substantial difference between a tube and two plates.

We claim:
1. A method for the mass separation of a liquid mixture through fractional crystallization comprising precipitating from a liquid phase, a crystal layer on the wall of a filled crytallization zone having at least one heat dissipating surface, wherein the liquid phase is cooled indirectly and the mass transfer occurs from thin boundary layers, and removal of the residual liquid phase and melting down of the crystal layer occur in one or more stages, wherein the thin boundary layers are produced by gas bubbles introduced at the bottom of the crystallization zone without recycling of the liquid phase, said gas bubbles gliding during their ascent as closely as possible along the heat-dissipating surface of said zone.

2. The method as set forth in claim 1, wherein the crystallization is carried out in cycles consisting of a plurality of stages, wherein the residual melt and the fractions from the first melting-down stages with low purity are each supplied to a feedstock from the stage of the following cycle with the corresponding purity, and the residual crystals serve as charge for the subsequent stage of the same cycle.

3. The method as set forth in claim 2, wherein the melt of the previous cycle with the same purity is used to melt down the residual crystals.

4. The method as set forth in claim 2, wherein the gas is returned, if necessary after cooling and free from the condensable portion.

5. The method as set forth in claim 1, wherein the case of crystalliation from volatile solvents the residual crystals are dried in vacuo prior to the melt-down.

* * * * *